US005701071A

United States Patent [19]

Liou et al.

[11] Patent Number: 5,701,071

[45] Date of Patent: Dec. 23, 1997

[54] SYSTEMS FOR CONTROLLING POWER CONSUMPTION IN INTEGRATED CIRCUITS

[75] Inventors: Jiunn-Yau Liou, Cupertino; Richard L. Wheeler, San Jose; Bidyut Sen, Milpitas; James C. Parker, Jr., Pleasanton, all of Calif.

[73] Assignee: Fujitsu Limited, Japan

[21] Appl. No.: 517,572

[22] Filed: Aug. 21, 1995

[51] Int. Cl.$^6$ .............................. G05F 1/10; G05F 1/613; G05F 1/12; G05B 24/02

[52] U.S. Cl. .......................... 323/220; 323/231; 323/298; 323/353

[58] Field of Search .................................... 323/311, 312, 323/313, 315, 233, 298, 353, 220, 229, 231, 223, 225

[56] References Cited

U.S. PATENT DOCUMENTS

| | | | |
|---|---|---|---|
| 3,535,613 | 10/1970 | Katzenstein | 323/8 |
| 3,881,150 | 4/1975 | Gay | 323/22 T |
| 3,895,286 | 7/1975 | Steckler | 323/4 |
| 3,899,692 | 8/1975 | Caswell | 307/228 |
| 4,119,440 | 10/1978 | Hile | 148/1.5 |
| 4,336,489 | 6/1982 | Frederiksen | 323/231 |
| 4,352,056 | 9/1982 | Cave et al. | 323/314 |
| 4,390,829 | 6/1983 | Jarrett | 323/231 |
| 4,398,142 | 8/1983 | Beasom | 323/226 |
| 4,511,413 | 4/1985 | Tuttle et al. | 148/187 |
| 4,562,400 | 12/1985 | Narasimhan | 323/281 |
| 4,599,631 | 7/1986 | Tsuzuki | 357/13 |
| 4,622,512 | 11/1986 | Brokaw | 323/313 |
| 4,677,369 | 6/1987 | Bowers et al. | 323/314 |
| 4,705,322 | 11/1987 | Yiannoulos | 361/91 |
| 4,766,469 | 8/1988 | Hill | 357/13 |
| 4,792,748 | 12/1988 | Thomas et al. | 323/312 |
| 4,819,044 | 4/1989 | Murakami | 357/23.4 |
| 4,835,111 | 5/1989 | Wright et al. | 437/20 |
| 4,870,467 | 9/1989 | Boland et al. | 357/13 |
| 4,886,762 | 12/1989 | Boland et al. | 437/15 |
| 4,928,159 | 5/1990 | Mihara et al. | 357/42 |
| 4,990,976 | 2/1991 | Hattori | 357/23.4 |
| 5,027,165 | 6/1991 | Doluca | 323/231 |
| 5,103,160 | 4/1992 | Bohac, Jr. | 323/223 |
| 5,229,708 | 7/1993 | Donig et al. | 323/223 |
| 5,357,416 | 10/1994 | Kitano et al. | 363/60 |
| 5,422,563 | 6/1995 | Pflueger | 323/312 |
| 5,493,207 | 2/1996 | Beasom | 323/313 |

OTHER PUBLICATIONS

Jacob Millman, Ph.D., *Microelectronics Digital and Analog Circuits and Systems,* McGraw-Hill Book Company, 1979, pp. 45–47.

*Primary Examiner*—Peter S. Wong
*Assistant Examiner*—Bao Q. Vu
*Attorney, Agent, or Firm*—Coudert Brothers

[57] ABSTRACT

Systems for controlling the current consumption of an integrated circuit chip and the like so as to reduce the inductive voltage drops occurring over the power supply lines within the chip and power supply lines to the chip are disclosed. The systems according to the present invention are applicable to circuits having two or more sub-circuits formed on a semiconductor substrate, each sub-circuit having two or more power supply inputs. An exemplary system comprises two or more current shunting elements formed on the substrate, with each current shunting element coupled in parallel with the power supply inputs of a selected sub-circuit. The system has at least two main power supply lines formed on the semiconductor substrate, with each selected sub-circuit having each of its power supply inputs coupled to a main power supply line. A current shunting element may comprise a Zener diode, an active shunt circuit, or equivalents thereof.

27 Claims, 4 Drawing Sheets

SYSTEMS FOR CONTROLLING POWER CONSUMPTION IN INTEGRATED CIRCUITS

FIELD OF THE INVENTION

The present invention relates to power distribution systems for integrated circuits and the like. The present invention is particularly applicable to large digital CMOS circuits formed on integrated circuit (IC) chips.

BACKGROUND OF THE INVENTION

With current semiconductor technology, millions of transistor devices can be integrated on a single semiconductor chip having an area of a square centimeter. The transistor devices are typically grouped in a plurality of sub-circuits, with each sub-circuit providing one or more functions. For example, a sub-circuit in a digital circuit may comprise a logic gate, a block of latches (memory elements), a multiplexer, an adder, an off-chip signal driver, etc. A sub-circuit in an analog circuit may comprise a differential amplifier, a multiplier, an output stage, a digital-to-analog converter, a phase-locked loop, etc. Each sub-circuit is supplied with power from two or more supply lines, with each sub-circuit having one or more circuit paths between the supply lines. A supply line may carry a supply voltage level or a "ground" reference level.

A popular device technology for both analog and digital integrated circuits is complimentary metal-oxide semiconductor (CMOS). A digital circuit implemented with CMOS technology has a power consumption advantage over other device technologies since CMOS digital logic gates consume power mainly when switching between logic states. A CMOS digital logic gate consumes a relatively small amount of power when it is not switching. Additionally, in comparison to n-channel metal-oxide semiconductor (NMOS) device technology or p-channel metal oxide semiconductor (PMOS) device technology, CMOS device technology enables greater flexibility in designing analog circuits.

When a CMOS logic gate switches state, it draws a pulse of current from a power supply line on the integrated circuit chip. Depending upon the complexity of the logic gate, it may draw more than one current pulse as it switches state. As the switching speed of CMOS transistors has increased, the switching time of a digital logic gate has decreased. Yet, the peak level of current drawn during switching has not decreased commensurately. Accordingly, as CMOS device technology has improved, the current pulses drawn by state-of-the-art CMOS digital circuits have become sharper and, therefore, have a higher frequency content.

Some analog sub-circuits exhibit digital-like behavior in terms of their consumption of current from the power supply lines. Likewise, the current pulses drawn from these analog sub-circuits have become sharper as device technology has improved, primarily because such improvements enable the analog sub-circuits to be operated at higher frequencies. Additionally, analog sub-circuits are generally more sensitive to variations in the supply voltage(s) than digital sub-circuits, and accordingly often require supply lines having less noise.

The on-chip power supply lines providing current to analog and digital sub-circuits have finite inductances. The inductance of a supply line increases substantially linearly as the line's length increases, and decreases approximately logarithmically as the line's width increases. The current pulses induce voltage drops along the supply lines as a function of the rate of change of the current drawn ($\Delta V = L \times dI/dt$, where L is the inductance of the supply line). During the rising edge of a current pulse, the voltage across the supply lines near the digital logic device is pulled down by an amount $\Delta V$ over its nominal value. During the falling edge of the current pulse, the voltage across the supply lines is pushed up by an amount $\Delta V$ over its nominal value. When two or more sub-circuits draw pulses at the same time, the voltage drops induced by the current pulses add constructively in lowering and raising the power supply voltage provided to them. If a significant number of current pulses occur simultaneously within a localized area of the IC chip supplied by the same supply line, the voltage provided to the sub-circuits of the area could change to a level which causes incorrect circuit operation.

There can also be a substantial amount of inductance in the power lines leading to the IC chip. When an IC chip is synchronized to a clocking signal, as is often the case for digital circuits, it is quite common for a significant number of the chip's logic circuits to change states within a short time duration. As such, the supply lines leading to the IC chip often see large current pulses that are synchronized with the clock signal. If the inductance of the power lines feeding the IC chip is significant, or if the rate of change in the current pulses is significant, a dip and surge in the power supply voltage having sufficient magnitudes to cause incorrect circuit operation could occur.

One conventional approach for addressing such voltage dips and surges has been to connect a bypass capacitor in parallel with the external supply lines at the point where the external supply lines connect to the chip. For voltage dips, the bypass capacitor provides temporary storage of energy which can be delivered to the IC chip without having to flow through the inductance of the external supply lines. The bypass capacitor also absorbs excess energy coupled to the chip from the external supply lines to minimize voltage surges. Unfortunately, the bypass capacitor has a series inductance of its own, which impairs its ability to provide energy during voltage dips and to absorb excess energy during voltage surges. The effects of the capacitor's inductance become more apparent as the current pulses become sharper (e.g., as switching frequencies increase).

When designed and properly positioned very close to the IC chip, bypass capacitors can address voltage dips and surges occurring in the supply to the chip to a great extent. However, they cannot address voltage dips and surges occurring locally within the integrated circuit chip. One conventional approach to this problem has been to increase the width of the supply lines so as to reduce their inductance. However, because the line inductance decreases approximately logarithmically as the line width increases, each decrement in line inductance must be accomplished by a proportionally greater increment in the line width. Unfortunately, increasing the line widths of the supply lines increases the area needed for power supply lines, and often increases the cost of manufacturing the IC chip and decreases device density.

While the approaches of using bypass capacitors and increasing the widths of supply lines have worked reasonably well in the past, they provide diminishing returns at higher operating frequencies. Accordingly, there is a need for more satisfactory approaches for providing power to IC circuits, particularly CMOS IC circuits, so as to enable IC circuits to operate at higher frequencies.

SUMMARY OF THE INVENTION

The present invention encompasses apparatuses for controlling the current consumption of an electrical circuit formed on a semiconductor substrate (e.g., an integrated circuit chip) and the like so as to reduce the inductive voltage drops (V=L×di/dt) occurring over the power supply lines within the chip and power supply lines to the chip. The electrical circuit draws a variable amount of power supply current as a function of time. An apparatus according to the present invention smooths the draw of current from the power supply such that the change in the supply current drawn with respect to time (di/dt) has a lower deviation from the average value, and a lower average magnitude.

Broadly stated, an apparatus according to the present invention comprises electrical supply means for delivering electrical current to the electrical circuit, and a variable shunt means coupled to the electrical supply means in parallel to the electrical circuit. The variable shunt means conducts a variable amount of current such that the total current drawn by the electrical circuit and the variable shunt means is smoother than the current drawn by the electrical circuit. A variable shunt means according to the present invention may comprise a current shunting element such as, for example, a Zener diode, a diode stack, a stack of diode-connected transistors, a non-linear resistor, an active shunt circuit, or similar arrangement.

In one embodiment of the present invention, the electrical circuit has one or more sub-circuits formed in an area of an integrated circuit chip, with each sub-circuit drawing a variable amount of current and with the electrical supply means delivering electrical current to each sub-circuit. Each sub-circuit has at least one circuit path between the supply lines, each circuit path coupling power between the supply lines as a function of the operation of the sub-circuit. Also in this embodiment, the variable shunt means is coupled to the electrical supply means in parallel to each of the sub-circuits, and positioned on the integrated circuit in the vicinity of the one or more sub-circuits. The variable shunt means conducts a variable amount of current such that the total current drawn by the one or more sub-circuits and the variable shunt means is smoother than the current drawn by each sub-circuit.

In a further embodiment, additional variable shunt means are included, each being coupled to the electrical supply means in parallel with a corresponding set of one or more sub-circuits. In this embodiment, there may be equal numbers of sub-circuits and variable shunt means, there may be more sub-circuits than variable shunt means, or there may be more variable shunt means than sub-circuits. The distribution of the current shunting elements among the sub-circuits prevents the voltage across the supply lines from rising above a certain level due to the above-described inductive effects, and thereby can reduce and/or prevent voltage surges.

In further embodiments of the present invention, one or more of the variable shunt means are biased to conduct currents which have substantially complimentary waveforms to the current waveforms of their corresponding sub-circuit. A more uniform draw of current is thereby achieved along with the reduction and/or prevention of local voltage surges on the power supply lines.

The present invention increases the power dissipation of the integrated circuit chip, which is often counter to the goals of circuit design, particularly the design of CMOS circuits. Nonetheless, the present invention provides substantial benefits in that the amount of bypass capacitance may be reduced, the line widths of power supply lines may be reduced, and the operating frequency of the IC chip may be increased.

The present invention also provides a number of additional benefits. When the current shunting elements are uniformly distributed on the chip and balanced with the sub-circuits, the temperature across the chip can be made relatively uniform. The uniformity in temperature reduces skews in clock and data signals of digital circuit that occur due to temperature gradients. This benefit is particularly important in high-speed circuit applications. Additionally, power consumption for the chips of the system can be made more predictable, thereby facilitating the design of cooling systems and minimizing design problems therein. Moreover, with a more even current flow to the chip, electromagnetic interference noise is minimized. Furthermore, power supply design for IC chips is simplified as such power supplies do not need to be designed to provided for high frequency transient currents.

Accordingly, it is an object of the present invention to smooth the current flow to IC chips and sub-circuits within such chips.

It is another object of the present invention to reduce the need for bypass capacitors.

It is still another object of the present invention to enable reduced width supply lines in IC chips, thereby reducing the area taken by such lines and reducing the cost of chips.

It is a further object of the present invention to facilitate the design of cooling systems for integrated circuit chip systems.

It is yet a further object of the present invention to facilitate the use of more simple and less expensive power supplies for high-speed IC chip systems.

These and other objects of the present invention will become apparent to those skilled in the art from the following detailed description of the invention, the accompanying drawings, and the appended claims.

DETAILED DESCRIPTION OF THE INVENTION

Figure 1:
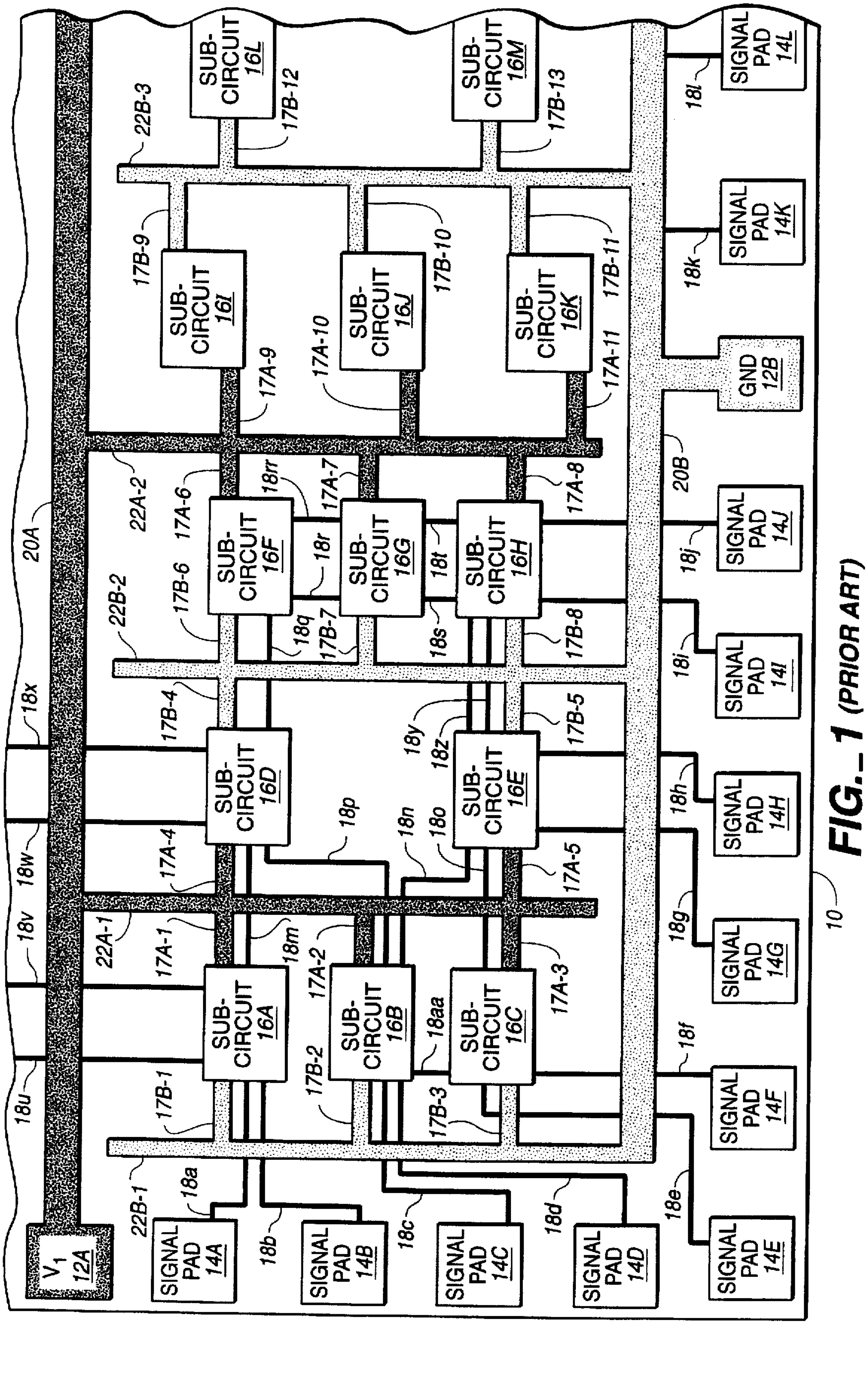
FIG. 1 (PRIOR ART)
FIG. 1 is a partial plan view of an exemplary integrated circuit (IC) chip showing signal pads and lines, power supply pads and lines, and sub-circuits (shown in block schematic form) according to the prior art.

FIG. 1 is a partial plan view of an exemplary integrated circuit (IC) chip 10 according to the prior art. IC chip 10 comprises at least two power pads 12A and 12B and a number of signal pads 14A–14L. Power is provided to IC chip 10 via power pads 12A and 12B, with pad 12A at a voltage $V_1$ and pad 12B at a ground reference (0V). Chip 10 may have one or more additional power pads for receiving voltage $V_1$, one or more power pads for receiving the ground reference, and/or one or more pads for receiving additional voltage levels. For typical CMOS digital circuits, the nominal value of $V_1$ is between 2.5 V and 5 V. For typical analog circuits, the nominal value of voltage $V_1$ is between 5 V and 15 V. Many analog circuits also have a negative voltage supply, with a typical value of between −5 V and −15 V. The actual values of the voltages on power pads 12A and 12B is not critical to the present invention.

Chip 10 further includes a plurality of sub-circuits 16A–16M and a plurality of signal lines 18 which interconnect sub-circuits 16A–16M to each other and to pads 14. Power is routed to sub-circuits 16 by way of primary power supply lines 20A and 20B, and secondary power supply lines 22A and 22B. Primary power supply lines 20A and 20B are connected to power pads 12A and 12B, respectively. Each of secondary supply lines 22A is coupled to primary supply line 20A, and each of secondary supply lines 22B is coupled to primary supply line 20B. Sub-circuits 16 draw power between the secondary supply lines 22A and 22B, drawing a variable amount of current as a function of time. Each sub-circuit 16 includes a first power supply input 17A coupled to secondary supply line 22A, and a second power supply input 17B coupled to secondary supply line 22B.

Typically, secondary power supply lines 22A and 22B are arranged substantially parallel to one another. Additionally, secondary power supply lines 22A and 22B typically couple into primary power supply lines 20A and 20B, respectively, substantially at right angles. However, such geometrical arrangements are not part of, or necessary for, the present invention. Although sub-circuits 16 are shown in FIG. 1 as being supplied from secondary power supply lines 22A and 22B, it is possible to provide power to one or more sub-circuits 16 directly from one or both of primary supply lines 20A and 20B.

Each of the power supply lines 20A, 20B, 22A and 22B has a respective amount of self-inductance per unit length, which depends upon its width and other factors. Some sub-circuits, such as sub-circuit 16A, have a lower amount of inductance between their supply input 17A and power pad 12A ($V_1$), whereas other sub-circuits, such as sub-circuit 16K, have a greater amount of inductance. Likewise, some sub-circuits 16 have a smaller amount of inductance between their second input supply 17B and power pad 12B, such as sub-circuit 16K, than other sub-circuits, such as sub-circuit 16A. As described above, the current drawn from the power supply lines by each sub-circuit 16 can vary dramatically as a function of time. For example, a digital sub-circuit 16 can draw large pulses of current if it comprises a substantial amount of CMOS circuitry that is clocked in unison. Such current pulses lead to induced voltage drops along the power supply lines 20A, 20B, 22A, and 22B. The voltage provided between power supply inputs 17A and 17B of each sub-circuit 16 may therefore vary dramatically, which may result in incorrect circuit operation.

Figure 2:
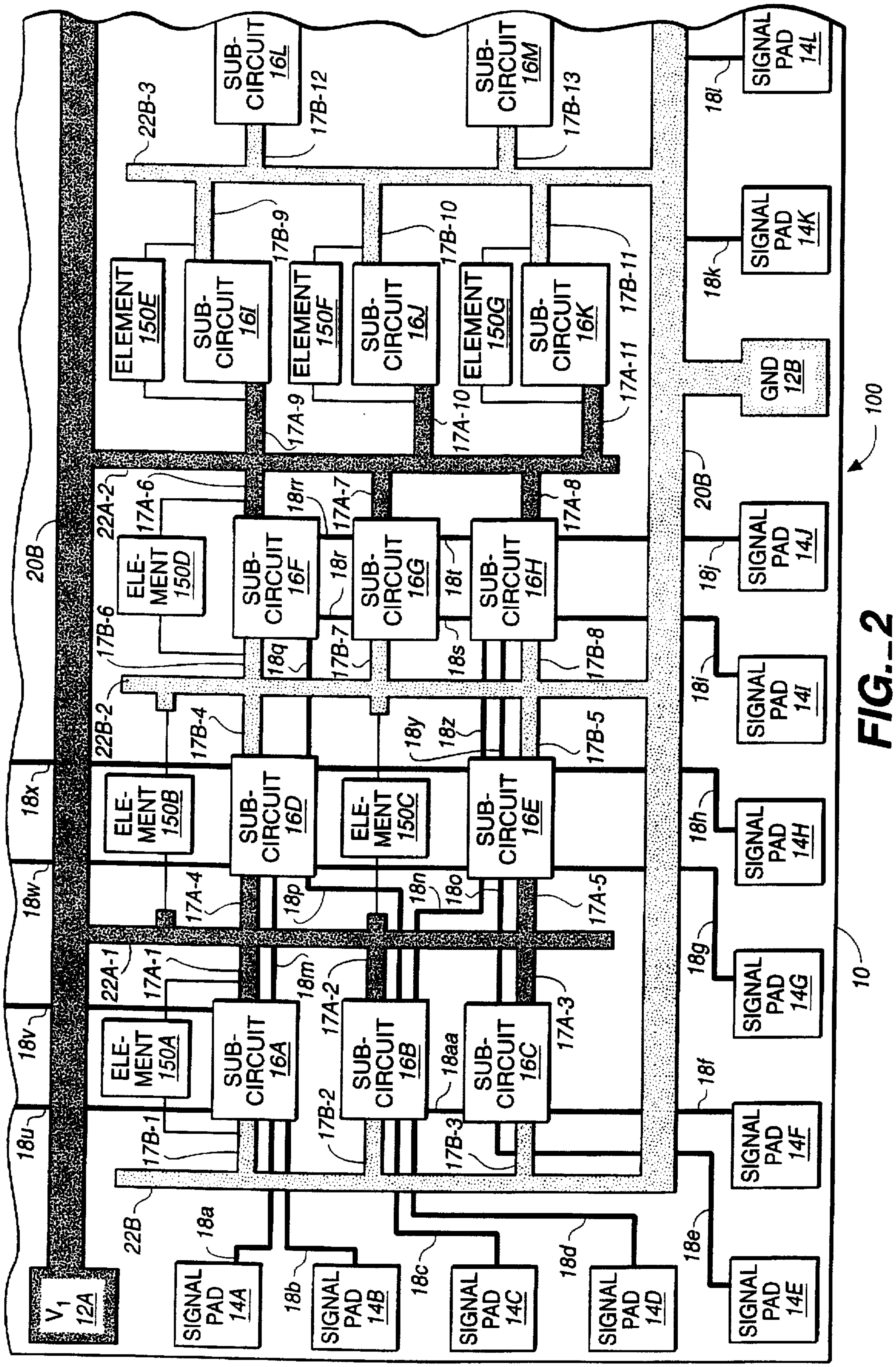
FIG. 2 is a partial plan view of an exemplary IC chip and a first embodiment of a power control system according to the present invention.

FIG. 2 is a partial plan view of exemplary IC chip 10 incorporating a first embodiment of a power control system according to the present invention. IC chip 10 comprises the same sub-circuits 16, pads 12 and 14, and signal lines 18 as those shown in FIG. 1. The power control system comprises a plurality of current shunting elements 150A–150G, and power supply lines 20A, 20B, 22A, and 22B. Each of current shunting elements 150A–150G comprises a variable shunting means according to the present invention. Each of current shunting elements 150 has a pair of terminals through which a shunting current may flow. Each of the terminals is coupled to a respective secondary power supply line 22A and 22B. Each of the current shunting elements selectively conducts current to smooth out the current flow through the power supply lines 20A, 20B, 22A, and 22B. By including the shunting elements to smooth the draw of current from the power supply, the magnitude of the variations in the supply current in the supply lines with respect to time (di/dt) are reduced, and the average magnitude thereof is also reduced. Additionally, the variations in the local supply voltage with respect to time (dv/dt), and the average magnitude thereof, are also reduced. The current shunting elements are distributed throughout the circuit and are preferably disposed close to corresponding sub-circuits. For example, current shunting element 150A operates to smooth the current flow to sub-circuits 16A–16C, and current shunting 150D operates to smooth the current flow to sub-circuit 16F–16H. Current shunting elements 150B, 150C, 150E, 150F, and 150G are each disposed near a corresponding sub-circuit.

The terminals of a current shunting element 150 may be coupled to the power supply lines in close proximity to the power inputs 17A and 17B of a sub-circuit, as for example, shown by element 150A, or may be coupled to the secondary power supplies at a short distance away therefrom, such as shown by current shunting elements 150B and 150C. If a number of sub-circuits coupled to the same secondary power supply lines do not have substantial variations in their power consumption, a single current shunting element may be used (e.g., 150A and 150D). If, on the other hand, a sub-circuit 16 has a substantial amount of variation in power consumption as a function of time, two or more current shunting elements 150 may be disposed in close proximity to that sub-circuit.

Figure 3:
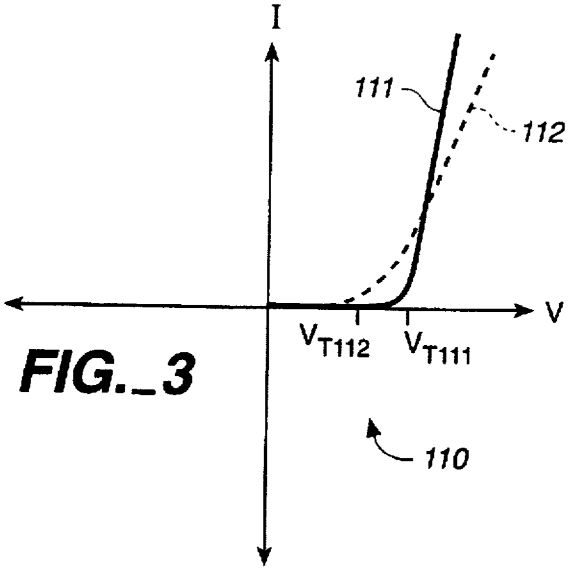
FIG. 3 is a graph of the current-voltage characteristics of some exemplary current shunting elements according to the present invention.
Figure 7:
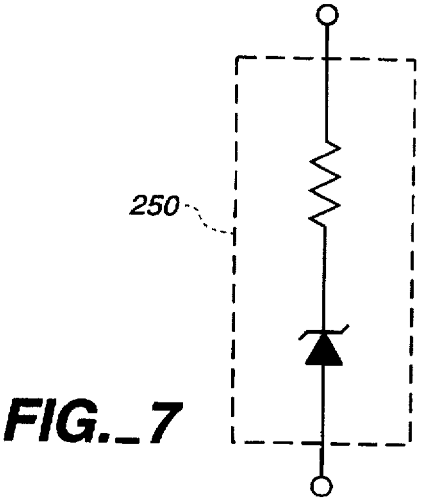
FIG. 7 is a schematic diagram of an exemplary embodiment of a current shunting element according to the present invention.
Figure 8:
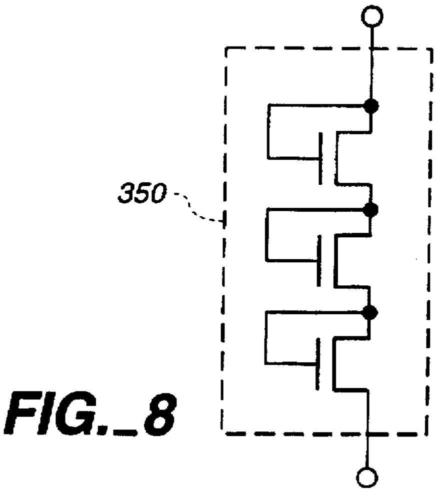
FIG. 8 is a schematic diagram of a second exemplary embodiment of a current shunting element according to the present invention.

A current shunting element 150 may comprise a zener diode device, a diode stack, a stack of diode-connected transistors, a non-linear resistor, active shunt circuit, or the equivalents thereof. A diode-connected transistor comprises a transistor with one of its conduction terminals (e.g., drain, source, collector, emitter) coupled to its modulation terminal (e.g., gate, base). An exemplary shunting element 150 which comprises a zener diode is shown in FIG. 7. A resistance may be included in series with the zener diode to provide for a desired on-resistance. An exemplary shunting element 150 which comprises a stack of diode-connected NMOS transistors is shown in FIG. 8. FIG. 3 shows a graph 110 of the current-voltage characteristics for an exemplary zener diode and an exemplary stack of diode-connected transistors. The characteristic of the zener diode is shown at 111, and the characteristic for the transistor stack is shown at 112. Each of the characteristics has a respective threshold voltage, i.e., $V_{T,111}$ and $V_{T,112}$, below which very little current is conducted. As the voltage across the elements increases above the threshold voltages, the elements conduct an increasing amount of current. At room temperature, the exemplary zener diode has a sharper turn-on characteristic than that of the exemplary stack of diode-connected transistors. The conductivity of each of these shunting elements increases as the magnitude of the voltage applied across its conduction terminals increases.

As is well-known in the art, zener diode devices may be formed with a number of device technologies, such as CMOS, NMOS, PMOS, bipolar, and Bi-CMOS processes. The threshold voltage $V_{T,111}$ may be adjusted to a desired value by adjusting the doping on the more lightly-doped side of the pn-junction. An implantation step may be used in controlling this doping level, as is well-known in the art. The threshold voltage $V_{T,111}$ with the stack of diode-connected transistors is equal to the sum of the threshold voltages of the transistors. The threshold voltage of each transistor is set by processing parameters, and the width and length of the device under certain conditions, as is well-known in the art. The slope of curve 112 for voltages greater than $V_{T,112}$ may be adjusted by varying the individual widths and lengths of the diode-connected transistors. The threshold voltage $V_{T,112}$ of the transistor stack may be varied in discrete steps by varying the number of transistors in the stack.

In one implementation of the embodiment shown in FIG. 2, current shunting elements 150 have threshold voltages equal to or greater than the nominal value for the supply voltage $V_1$, and do not conduct a substantial amount of current until the voltage across their conduction terminals exceeds the nominal value of supply voltage $V_1$ plus a predetermined amount $\Delta V_{LIM}$, for example $\Delta V_{LIM}$=0.25 volts. The voltage across each of the sub-circuits 16 is thereby prevented from substantially exceeding the nominal value of the supply voltage $V_1$. Such an excess voltage could be caused by a surge of inductive current in the supply lines during the falling edge of a current pulse from a sub-circuit. The inductance in the supply lines would cause this current to keep flowing after the sub-circuits have ceased drawing current from the supply lines. The current surge is partially absorbed by the sub-circuit in its low current state (e.g., leakage current for CMOS circuits), and is partially absorbed by the parasitic capacitance of the supply lines, which causes the voltage across the supply lines to rise above the nominal value $V_1$. When the voltage rises above approximately $V_1+\Delta V_{LIM}$, current shunting elements 150 become conductive, and the inductive current would then continue to flow into the current shunting elements 150. Because the conductivity of the shunting elements increases as the magnitude of the voltage applied across their conduction terminals increases, the elements are readily able to absorb current surges with relatively small increases in voltage over $V_1+\Delta V_{LIM}$.

In another embodiment according to the present invention, the current shunting elements 150 shown in FIG. 2 have threshold voltages which are below the nominal value of supply voltage $V_1$. In this embodiment, each of the current shunting elements conducts current as long as the voltage across its conduction terminals remains above its threshold value. The current shunting elements 150 in this embodiment collectively operate to keep a minimum amount of current flowing in the supply lines at all times during chip operation. When a sub-circuit 16 begins to draw a pulse of current from the supply lines, the supply voltage across its supply inputs 17A, and 17B decreases in value. The reduction in the value of local supply voltage $V_1$ causes the current conducted by the current shunting elements in close proximity to the sub-circuit to draw less current. The reduction also causes the current flowing to the supply lines to increase by causing a positive voltage to be applied across the induction of the supply lines (i.e., $\Delta i=\Delta V \Delta t/L$, where $\Delta t$ is the duration of the voltage reduction $\Delta V$, and L is the effective inductance in the supply lines to the sub-circuit). Thus, current is diverted from the shunting elements to the sub-circuit, where it is needed, and the level of current from the supply lines is increased. When the sub-circuit 16 finishes drawing a current pulse, the voltage across the supply lines in close proximity to the sub-circuit rises, causing the nearby current shunting elements to draw more current. When the local value of the supply voltage $V_1$ rises above the nominal value of the supply, a negative voltage is applied across the inductance of the supply lines, which causes current flowing in the supply lines to the area to decrease. In this manner, the amount of current flowing through the power supply lines to the sub-circuit and shunting elements remains relatively constant.

If the surrounding current shunting elements 150 are able to provide the peak current of a sub-circuit 16, the local value of the supply voltage $V_1$ will not fall substantially below the threshold voltage $V_T$ of the shunting elements. If a sub-circuit 16 requires more peak current than the surrounding current shunting elements 150 can provide, the sub-circuit first lowers the local value of the supply voltage $V_1$ to the threshold voltage $V_T$ of the surrounding shunting elements 150 to take all the current the surrounding elements 150 can provide. The sub-circuit then lowers the local supply voltage to a value below $V_T$ sufficient to cause the supply lines to provide the remaining current. This latter voltage reduction can be relatively large and sharp, and can create a relatively large surge of current in the lines. In some cases, the effects of this voltage reduction on circuit operation can be tolerated. To reduce these effects, each current shunting element may be designed to conduct a peak amount of current which is substantially equal to the peak amount of current required by its corresponding sub-circuit(s). In such a case, each sub-circuit would not lower the local supply voltage below a level approximately equal to the threshold voltage $V_T$.

In some cases, a single current shunting element may be used for multiple sub-circuits, for example, if there are a number of sub-circuits in a local area which draw current from the supply at different times in a phased relationship to one another. In such a case, a number of lower-current drawing shunting elements may be used, with each element current being positioned close to a corresponding sub-circuit to provide better responsiveness. Each of the sub-circuits and shunting elements draw its peak current from the supply from at least one common supply line. For example, a group of four digital sub-circuits which draw power from the supply during separate portions of the master clock, with the peak current drawn being $I_{MAX}$. Four current shunting elements, collectively drawing a peak current of between $0.5\times I_{MAX}$ and $1.5\times I_{MAX}$ may be positioned near respective sub-circuits. The elements may collectively draw a peak current substantially equal to $I_{MAX}$. The elements may draw substantially equal percentages of the collective total (e.g., $0.25\times I_{MAX}$), or may draw unequal percentages.

Referring to the I–V characteristics shown in FIG. 3, a steeper slope for voltages above the thresholds enables smaller local changes in the supply voltage to effect the same change in current. To reduce the amount of voltage needed to shut off the current shunting element, the shunting element may be designed to have a steep current slope, such as that shown by curve 111 in FIG. 3. Such a shunting element should be designed with very good control of threshold voltage so that the desired quiescent peak current can be reliably obtained.

Figure 4:
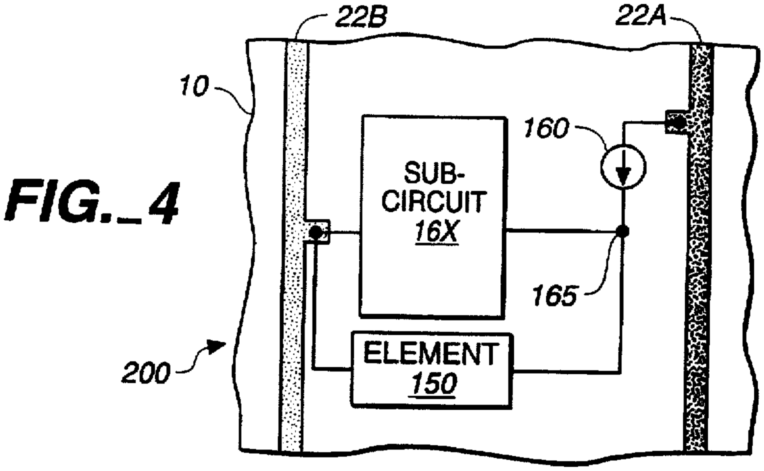
FIG. 4 is a partial plan view of an exemplary IC chip and a second embodiment of a power control system according to the present invention.
Figure 9:
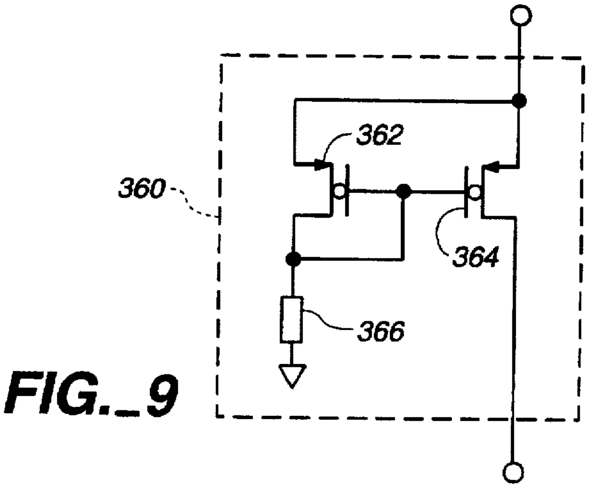
FIG. 9 is a schematic diagram of a first exemplary embodiment of a current source according to the present invention.

FIG. 4 shows a partial plan view of another embodiment of a power control system according to the present invention which is less sensitive to variations in threshold voltages of the shunting elements 150. IC chip 10 comprises the same sub-circuits 16, pads 12 and 14, and signal lines 18 as those shown in FIGS. 1 and 2. For the sake of clarity, a single sub-circuit is shown in FIG. 4. The power control system comprises power supply lines 20A, 20B, 22A, and 22B, and a current shunting element 150 and a current source 160 for a group of one or more sub-circuits, one of which being shown at 16X in FIG. 4. Each current source 160 provides current to a parallel combination of a current shunting element 150 and the group of sub-circuit(s) 16X. Current source 160 supplies an amount of current equal to or greater than the peak current required by sub-circuit(s) 16X. The voltage across the group of sub-circuit(s) 16X during the time it is not drawing current is set by current shunting element 150. When a sub-circuit 16X draws current, it lowers the voltage across the parallel combination and causes the current from shunting element 150 to be diverted to the sub-circuit 16X without substantially changing the voltage across supply lines 22A and 22B. An exemplary embodiment of such a current source is shown at 360 in FIG. 9. Current source 360 comprises a well known current mirror, which is implemented with two PMOS transistors 362 and 364, and an impedance element 366, which may for example comprise a resistor. Other current source circuits known to the art may also be used.

Figure 5:
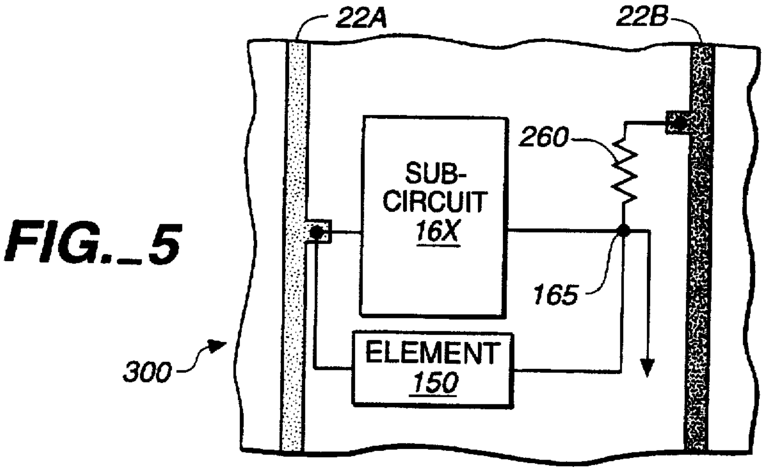
FIG. 5 is a partial plan view of an exemplary IC chip and a third embodiment of a power control system according to the present invention.

FIG. 5 shows a partial schematic diagram of another embodiment of a power control system according to the present invention which also has lower sensitivity to variations in threshold voltages of the shunting elements 150. IC chip 10 comprises the same sub-circuits 16, pads 12 and 14, and signal lines 18 as those shown in FIGS. 1, 2 and 4. For the sake of clarity, a single sub-circuit is shown in FIG. 5. The power control system comprises power supply lines 20A, 20B, 22A, and 22B, and a current shunting element 150 and a resistor 260 for a group of one or more sub-circuits, one of which being shown at 16X in FIG. 5. Each resistor 260 provides current to a parallel combination of a current shunting element 150 and the group of sub-circuit(s) 16X. The characteristics of resistor 260 and shunting-element 150 are chosen such that resistor 260 can supply the peak amount of current to the group of sub-circuit(s) 16X without the voltage to the sub-circuit(s) falling to an unacceptable level.

The following example is given for a single CMOS digital sub-circuit having a peak current demand of 10 mA, and a minimum required voltage of 4.25 V. Element 150 comprises a zener diode having a threshold of 4.7 V with a tolerance of 5%, and an incremental on-resistance of 15 ohms. The supply voltage $V_1$ is set at 6.0 V. The voltage $V_Z$ across the zener diode when it is conducting zener current is $V_Z=V_T+15I_Z$, where $I_Z$ is the zener current. When the sub-circuit is not drawing current, the current through the series combination of the zener device and resistor 260 is:

$$I_z=\frac{6.0\text{V}-(V_T+15I_Z)}{R_{260}} \qquad (1)$$

where $R_{260}$ is the resistance of resistor 260. This equation can be simplified as:

$$I_Z=\frac{6.0\text{V}-V_T}{R_{260}+15} \qquad (2)$$

To set a current of 10 mA through the series combination with $V_T$=4.7 V, $R_{260}$ is set at a value of 110 ohms. At that current level, the voltage across the Zener diode is 4.85 V. When the sub-circuit draws its maximum current, the voltage falls down to approximately 4.7 V.

If the threshold voltage of the Zener device is at the lower end of its 5% tolerance ($V_T$=4.465 V), the Zener current $I_Z$ would be at approximately 12.3 mA, which is approximately 2.3 mA above that of the maximum drawn by the sub-circuit. At that current level, the voltage across the Zener diode is approximately 4.65 V. When the exemplary sub-circuit draws its maximum current, the voltage falls down to approximately 4.5 V. If the threshold voltage of the Zener device is at the upper end of its 5% tolerance ($V_T$=4.94 V), the Zener current $I_Z$ would be at approximately 8.5 mA, which is approximately 1.5 mA below that of the maximum drawn by the sub-circuit. At that current level, the voltage across the Zener diode is approximately 5.1 V. When the sub-circuit draws its maximum current, the sub-circuit takes all of the Zener's 8.5 mA, and temporarily draws an additional 1.5 mA from the supply lines. The drawing of the additional current does cause inductive voltage drops in the supply lines and a current surge in the supply lines after the pulse is drawn. However, a 1.5 mA current pulse drawn from the supply lines is much more tolerable than a 10 mA current pulse because the voltage dip required to generate it is approximately one-sixth that required to generate a 10 mA current pulse, and because the magnitude of the subsequent current surge in the supply lines is approximately one-sixth of that caused by a 10 mA pulse.

When the maximum Zener diode current is at 10 mA ($V_T$=4.7 V), the quiescent power dissipation of the Zener diode and resistor is 60 mW. When the maximum Zener diode current is 8.5 mA ($V_T$=4.94), the quiescent dissipation of the Zener diode and resistor is 51 mW. In the first case, substantially no additional current is drawn from the supply lines when the sub-circuit switches (which would require drawing current). In the second case, additional current is drawn, which causes inductive voltage drops. Accordingly, there is a trade-off between quiescent power dissipation and the magnitude of inductive voltage drops. (This trade-off also exists for other embodiments of the present invention shown FIGS. 2 and 3.) The peak current drawn in the shunting element may be selected to be at least one-third of the peak current drawn by its corresponding sub-circuit(s), causing the inductive voltage drops to be reduced by at least approximately 33%. Increasing the peak current of the shunt to be at least one-half of the peak current of its sub-circuit(s) would cause the inductive voltage drops to be reduced by at least approximately 50%.

Figure 6:
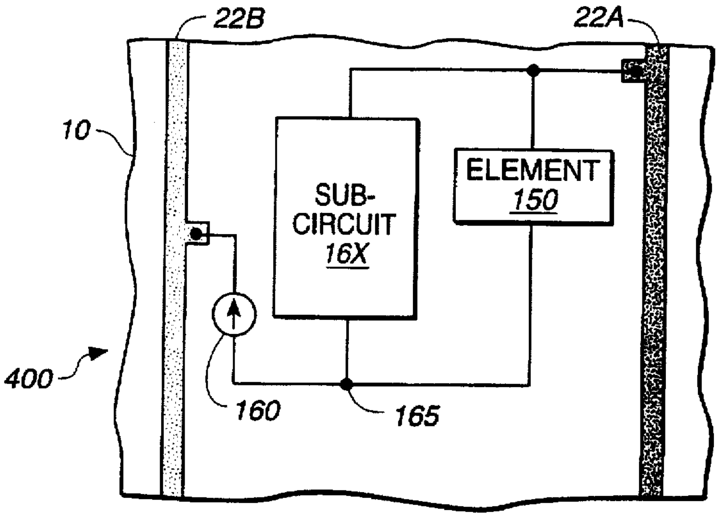
FIG. 6 is a partial plan view of an exemplary IC chip and a fourth embodiment of a power control system according to the present invention.

In each of power control systems 200 and 300, each of the shown current source 160 and resistor 260 are coupled between a power supply line 22A ($V_1$) and the parallel combination of a current shunting element 150 and a sub-circuit 16X. It may be appreciated that each of current source 160 and resistor 260 may instead be coupled between a power supply line 22B (GND) and the parallel combination, as shown in FIG. 6 by another embodiment 400 of a power control system according to the present invention.

While the present invention has been particularly described with respect to the illustrated embodiments, it will be appreciated that various alterations, modifications and adaptations may be made based on the present disclosure, and are intended to be within the scope of the present invention. For example, a current shunting element may comprise a series combination of a Zener diode and a diode-connected transistor. Such a combination may be constructed to provide better temperature stability for the shunting element. Additionally, a real current source (i.e., non-ideal current source) may be coupled in series with a shunting element so to regulate the maximum current conducted by the shunting element, and thereby minimize the variations caused by device parameters. In a real current source, the current goes to zero as the voltage across its terminals is reduced, once the voltage falls below a "knee" voltage. Above the "knee" voltage, the current is relatively flat. The reduction of current below the knee voltage enables the series combination of shunting element and the non-ideal current source to divert current to one or more sub-circuits when the local supply voltage dips.

What is claimed is:

1. An apparatus for smoothing the current drawn in an area of an integrated circuit chip where one or more sub-circuits are formed, each sub-circuit drawing a variable amount of current, said apparatus comprising:

electrical supply means for delivering electrical current to each said sub-circuit; and a variable shunt means coupled to said electrical supply means in parallel to each said sub-circuit and positioned on said integrated circuit in the vicinity of said one or more sub-circuits, said variable shunt means conducting a variable amount of current such that the total current drawn by said one or more sub-circuits and said variable shunt means is smoother than the current drawn by each said sub-circuit.

2. The apparatus of claim 1 wherein said supply means has an inductance associated therewith, and wherein said variable shunt means conducts a variable amount of current such that the effects of said inductance are substantially mitigated.

3. The apparatus of claim 1 further comprising a plurality of said variable shunt means coupled to said electrical supply means in parallel to each sub-circuit and positioned on said integrated circuit in the vicinity of said one or more sub-circuits.

4. The apparatus of claim 1 wherein the current collectively drawn by said one or more sub-circuits from said electrical supply means varies between a minimum value and a maximum value, and wherein said variable shunt means draws a current from said electrical supply means when said one or more sub-circuits draw said minimum value of current.

5. The apparatus of claim 1 wherein said variable shunt means has a pair of conduction terminals coupled to said electrical supply means, and a conductivity which increases as the magnitude of the voltage applied across its conduction terminals increases.

6. The apparatus of claim 1 wherein said supply means has an inductance associated therewith, wherein each said sub-circuit generates surges of current in the supply lines as its varies the amount of current conducted from the lines, and wherein said variable shunt means absorbs said current surges.

7. The apparatus of claim 1 further comprising a current source which provides current from said electrical supply means to the parallel combination of said one or more sub-circuits and said variable shunt means.

8. The apparatus of claim 7 wherein said current source comprises a current mirror.

9. The apparatus of claim 1 further comprising a resistor which provides current from said electrical supply means to the parallel combination of said one or more sub-circuits and said variable shunt means.

10. The apparatus of claim 1 wherein said variable shunt means comprises an electrical device having non-linear current versus voltage characteristic.

11. The apparatus of claim 1 wherein said variable shunting means comprises a diode-connected transistor.

12. The apparatus of claim 1 wherein said variable shunting means comprises a MOSFET transistor having its gate terminal coupled to its drain terminal.

13. The apparatus of claim 1 wherein said variable shunting means comprises a Zener diode.

14. The apparatus of claim 1 wherein said variable shunting means comprises a series combination of a Zener diode and a resistor.

15. The apparatus of claim 1 wherein said variable shunt means draws a peak current which is at least one-third of the peak current drawn by the one or more sub-circuits.

16. The apparatus of claim 1 wherein said variable shunt means draws a peak current which is substantially equal to the peak current drawn by the one or more sub-circuits.

17. The apparatus of claim 1 wherein said electrical circuit further includes a plurality of sub-circuits which alternately draw their peak currents from the supply from at least one common supply line in a phased relationship to one another, said plurality of sub-circuits collectively drawing a maximum peak current $I_{MAX}$, and wherein said apparatus further comprises a plurality of said variable shunt means coupled to said at least one common supply line and collectively drawing a peak current in the range of $0.5 \times I_{MAX}$ and $1.5 \times I_{MAX}$.

18. The apparatus of claim 17 wherein said plurality of variable shunt means collectively draw a peak current substantially equal to $I_{MAX}$.

19. The apparatus of claim 1 wherein said electrical supply means comprises first and second power pads formed on the chip for receiving external connectors which supply power, and first and second power supply lines formed on the chip and which provide power to one or more of the sub-circuits, each said supply line having an end coupled to a respective power pad and a location where it is coupled to said variable shunt means, said first power supply line having a portion which is at least 50 microns long located between the power pad and said variable shunt means, said portion having a width of not more than 20 microns.

20. The apparatus of claim 19 wherein the distance which current travels through said first power supply line from the power pad to said variable shunting means is more than 500 microns.

21. A power control apparatus for an electrical circuit being formed on a semiconductor substrate and drawing a variable amount of power supply current, said apparatus comprising:

first and second power supply lines formed on said substrate and providing power to the electrical circuit; and two or more current shunting elements formed on said substrate, each current shunting element having a pair of conduction terminals coupled to respective power supply lines, said shunting elements drawing a variable amount of current such that the total current drawn by the electrical circuit and said shunting elements is smoother than the current drawn by the electrical circuit.

22. The apparatus of claim 21 wherein one of said current shunting elements is coupled to said first power supply line at a first location on said first power supply line and another of said current shunting elements is coupled to said first power supply line at a second location on said first power supply line, and wherein the electrical circuit has at least one circuit path between said first and second power supply lines, said circuit path being coupled to said first power supply line at a third location on said first power supply line, said third location being located between said first and second locations.

23. A power control apparatus for an electrical circuit being formed on a semiconductor substrate and drawing a variable amount of power supply current, said apparatus comprising:

first and second power supply lines formed on said substrate and providing power to the electrical circuit, each supply line having an inductance, the variable current drawn by said electrical circuit generating variations in the voltages of the supply lines; and two or more current shunting elements formed on said substrate, each current shunting element having a pair of conduction terminals coupled to respective power supply lines and a conductivity which increases as the magnitude of the voltage applied across its conduction terminals increases, said shunting element being biased to draw a variable amount of current in response to voltage variations in the supply line causing the total current drawn by the electrical circuit and said shunting elements to be smoother than the current drawn by the electrical circuit.

24. The apparatus of claim 23 wherein the current drawn by the electrical circuit from said power supply lines varies between a minimum value and a maximum value, and wherein said shunting elements collectively draw a current from said electrical supply means when the electrical circuit draws its minimum value of current.

25. A power control apparatus for an electrical circuit being formed on a semiconductor substrate and drawing a variable amount of power supply current, said apparatus comprising:

first and second power supply lines formed on said substrate and providing power to the electrical circuit, each supply line having an inductance, the variable current drawn by said electrical circuit generating surges of current in the supply lines, said current surges generating corresponding voltage surges on said supply lines; and two or more current shunting elements formed on said substrate, each current shunting element having a pair of conduction terminals coupled to respective power supply lines and a conductivity which increases as the magnitude of the voltage applied across its conduction terminals increases, each shunting element responding to a voltage surge by increasing its conductivity to absorb the corresponding current surge.

26. An apparatus for smoothing the current drawn of an integrated circuit chip having a plurality of sub-circuits (16A–16M) formed thereon, the sub-circuits drawing a variable amount of current, said apparatus comprising:

electrical supply means (20A, 20B, 22A-1, 22B-1, 22A-2, 22B-2, 22B-3) formed on the substrate of the integrated circuit chip for delivering electrical current to each said sub-circuit; and at least seven variable shunt elements (150A–150G) coupled to said electrical supply means in parallel with the sub-circuits (16A–16M), said elements (150A–150G) being distributed among the sub-circuits (16A–16M) with each element being positioned on said integrated circuit in the vicinity of a sub-circuit, each said variable shunt element conducting a variable amount of current such that the total current drawn by the sub-circuits and said variable shunt elements is smoother than the total current drawn by the sub-circuits.

27. The apparatus of claim 26 wherein the sub-circuits (16A–16M) comprise digital circuits which are clocked in unison.

* * * * *